Jan. 29, 1963 H. T. GOLDE ETAL 3,075,805
SUN ROLLER BLIND
Filed Dec. 31, 1958
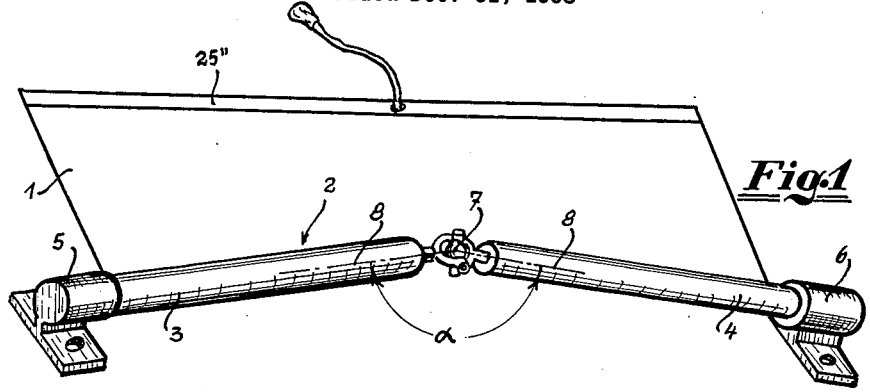
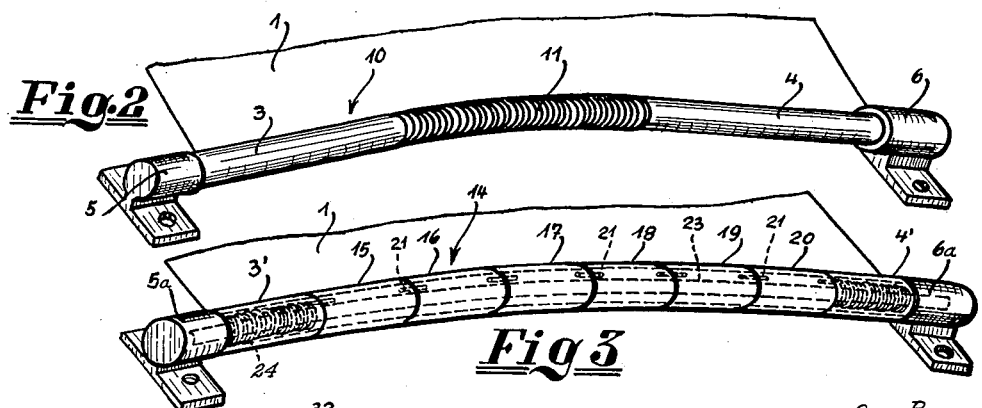
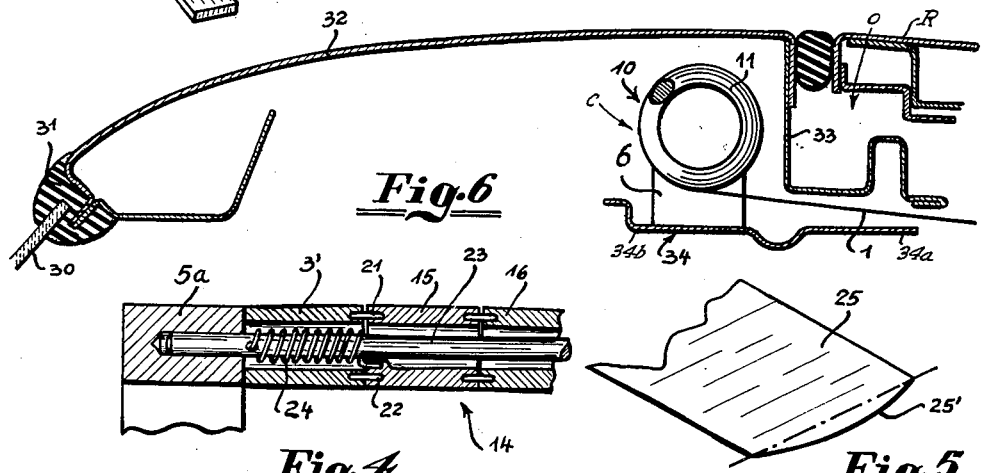
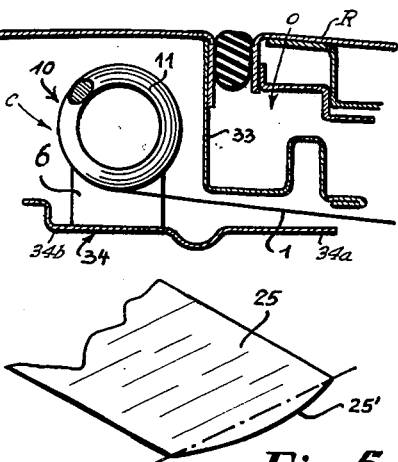
INVENTOR
BY
ATTORNEY

3,075,805
SUN ROLLER BLIND

Hans T. Golde, Hanauer Landstr. 338, Frankfurt am Main, Germany, and Johannes Werner, Wilhelm-Leuschner-Str. 33, Offenbach (Main), Germany
Filed Dec. 31, 1958, Ser. No. 784,171
Claims priority, application Germany Jan. 8, 1958
4 Claims. (Cl. 296—137)

The invention relates to a roof structure having an arcuate shape and of the type including a blind or the like comprising two rotatably arranged shafts to which an awning is fastened so that it can be wound up and unwound. The invention relates more particularly to the construction of a roller blind for curved surfaces especially for the roofs of motor vehicles.

The use of sun roller blinds has been found very advantageous in vehicles which are provided with sliding roofs and which are driven mainly in those latitudes where they are exposed to intense sunlight. However, the mounting of a roller blind in a motor vehicle with a sliding roof encounters difficulties due to the conventional curvature of the vehicle roof. There is a further disadvantage that the roller blind might project too far into the interior of the car thereby curtailing the view of the driver.

An object of the invention, therefore, consists of providing a sun roller blind, the curvature of which can be adjusted at will in accordance with the curvature of the roof of the associated vehicle.

According to the invention, this object is attained with a sun roller blind, in which the axes of two shafts are angularly disposed, at least one cardan-like or universal connecting piece permitting a bending of the roller blind. The flexibly supported roller blind can then be adapted to the curvature of the roof without interfering with the rotation of the shafts required for operating the roller blind. Much space can then be saved by accommodating the roller blind between the fixed front portion of the roof and the front edge of the frame of the sliding roof, the roller blind being preferably covered by a cloth-covered rail which is adjacent the frame of the sliding roof and which is firmly connected to the roof. Fastening to the arcuate roof structure can be effected by two bearing supports which are constructed in such a way that they receive respective of the ends of the roller blind shafts. The center lines of which define an angle smaller than 180 degrees at an intersection between the bearings.

The flexible construction of the intermediate portion between the supports of the roller blind according to the invention can very simply be achieved in that a flexible joint connecting said two shafts is rotatably journaled in the supports. One embodiment of the flexible joint is a pair of engaging cardan members. The use of two suitably spaced pairs of cardan members will produce a still better adaptation to the curvature of the roof.

A second embodiment of the flexible joint includes a flexible cable to provide a flexible member connecting the respective ends of said two shafts. A third embodiment of the flexible joint includes a plurality of hollow, cylindrical members coupled to each other to provide a hollow curved self-supporting cylindrical tube adapted to the curvature of the roof, the separate hollow self-supporting cylindrical members being connected for common rotation with play in an axial direction.

A curved sun roller blind constructed according to the invention may be developed, in a manner known per se, as a snap-back roller blind, return springs being provided for this purpose.

Since a flexible roller blind according to the invention has no rigid connection member between the two bearing supports, a further feature of the invention provides that the forces acting on the roller blind in case of pull be advantageously distributed perpendicularly to the axis in such a manner that they act substantially in the vicinity of the shaft ends and to a lesser degree in the bowed center of the roller blind. This effectively prevents jamming of the bearings. According to the invention, such distribution of forces can be produced very simply in that the end of the awning to be fastened to the rotatable shaft follows a slightly outwardly curved course. In this manner, there is more fabric in the middle region of the shaft and the fabric is wound up very loosely, whereas the fabric at the ends of the shaft is rolled up tightly, so that, when the roller blind is operated, the main forces, which simultaneously serve to tension the return springs, become effective at these places.

It is, furthermore, of advantage to border and to stiffen the front edge of the roller blind with a firm metal strip so that, even when the center of the front edge is pulled, the tractive force is transmitted to the lateral edges of the web of the fabric or the awning.

Some embodiments of the invention are explained below and illustrated by the accompanying diagrammatic drawings, in which:

FIG. 1 shows a roller blind of the invention with a cardan joint;

FIG. 2 shows an embodiment with an inserted flexible cable;

FIG. 3 shows another embodiment with several cardan-like joints;

FIG. 4 is an enlarged view, partially in section, of a detail of FIG. 3;

FIG. 5 is a perspective view of a portion of the fabric attached to any of the aforesaid rollers; and FIG. 6 is a partial longitudinal section through a sliding roof showing the positioning of a roller blind according to the invention.

FIG. 1 illustrates an awning 1, the end of which is secured to rotatable shafts 3 and 4, each rotatably positioned in the bearing brackets 5 and 6. The bearing supports 5 and 6 serve for fixing the roller blind to the roof of the vehicle. These shafts 3 and 4 may contain, in a manner known per se, conventional return springs.

In this embodiment of the invention, as shown in FIGURE 1, a flexible connecting member in form of a cardan joint 7 consisting of a pair of cardan members is provided between the adjacent ends of the shafts 3 and 4, which form an angle $\alpha$ less than 180 degrees at an intersection of their center lines, the universal flexibility permitting the assembly to rotate without a change of the position of its longitudinal center lines 8. The angle formed by the center axes or lines of the two shaft ends 3 and 4 is approximately adapted to the curvature of the roof when the bearings are adjusted.

The view of FIG. 2 corresponds to that of FIG. 1 and shows another embodiment, the same members being provided with the same reference characters. The positioning of the shafts 3 and 4 corresponds to that described for FIG. 1; however, in this case, the cardan-like, universally flexible center portion of the assembly 10 is formed of a flexible cable or coil spring 11 which is inserted between the shafts 3 and 4 and takes the place of the cardan joint 7 of FIG. 1.

In the embodiment according to FIG. 3, the flexible connecting member is constructed of a plurality of hollow self-supporting cylindrical members 15 to 20. The equally hollow shafts 3' and 4' are positioned in the bearing supports 5 and 6 in a manner analogous to that described for the preceding embodiments. The individual sections 15 to 20 are connected to one another and to the shafts 3' and 4' by pins 21, 22 engaging in aligned holes for effecting rotation in unison of the cylindrical sections. Instead of said pins, it is possible to use any other suitable connection by means of which the individual sections are connected with axial play for common rotation.

Buckling of this assembled arcuate, self-supporting tube 14 can be prevented by an insertion of a rigid rod 23 curved in accordance with the curvature of the roof and rigidly held in the bearing supports 5a and 6a, and the rod 23 does not participate in the rotation of the flexible tube 14.

FIG. 3 also shows on each side a coil spring 24 which serves as return spring for the roller blind. One end of each spring 24 is fastened to the fixed center rod 23 and the other end is secured to an adjacent, rotatable shaft 3' or 15, or 4' or 20.

FIG. 5 shows the end of a roof awning to be secured according to the invention to a flexible assembly of the above-noted type. The awning consists of a suitable air-pervious fabric 25, and the edge 25' to be secured to the assembly 2, 10 or 14 is slightly outwardly curved so that the tractive force exerted on the bowed center of the assembly is very small in contrast to the stronger traction exerted, by way of the shorter lateral edges of the awning, on the ends of the assembly.

Fastening of the edge 25' to a curved roller blind assembly according to the invention is effected in any suitable manner, for example, by glueing. According to the invention, the free end of the awning 25 is advisably reinforced by a rigid rail 25'' (FIG. 1) to avoid that the traction exerted during the opening of the roller blind acts only on the center of said free edge.

FIG. 6 shows a median longitudinal section through the front portion of a motor vehicle provided with a sliding roof R. FIG. 6 shows, more particularly, the top portion of the windshield 30 with its support 31, the front portion 32 of the rigid roof portion and the sheet-metal section 33 of the front transverse portion of the roof frame which surrounds the skylight opening O provided for the sliding roof. The position of a curved roller blind such as, for example, the roller blind according to FIG. 2, is shown in cross section with the associated awning 1. As can be seen, owing to its longitudinal curvature adapted to the transverse curvature of the roof 32, the roller blind 10 can be housed in the chamber C between the roof portion 32, a rail 34 and the front portion of the frame 33 of the sliding roof. The free end of the roller blind 1 issues through a narrow gap which is formed between the roof frame 33 and a portion 34a of rail 34. The rail 34 is advisably provided with a covering made of the same material as the covering of the sliding roof canopy. It is fixedly positioned laterally on the vehicle, adjacent the front edge of the canopy, the portion 34b thereof covering the rolled-up roller blind.

What is claimed is:

1. A roof structure having an arcuate shape and comprising a fixed rigid roof with a skylight opening, a section of said rigid roof bounding said opening, two supports rigidly secured to said section and each including a bearing, the two bearings having respective center axes cooperatively defining an angle other than 180 degrees and corresponding to said arcuate shape of said roof structure, two shafts of substantially the same diameter rotatably positioned in said bearings, a flexible member connecting said shafts and constituting a roller assembly therewith, and an awning having one edge fixed to said assembly across substantially the entire breadth thereof and a second edge adapted for having a tractive force applied thereto, said second edge being rigid and said one edge being curved to render the center of the awning longer than the longitudinal edges thereof to reduce stresses in said center, said one edge being secured to the roller assembly parallel to the axis of each shaft.

2. A roof structure as claimed in claim 1, wherein said flexible member includes a cardan member fixed to said shafts.

3. A roof structure as claimed in claim 1, wherein said flexible member includes a flexible cable fixed to said shafts.

4. A roof structure as claimed in claim 1, wherein said flexible member includes a plurality of hollow cylindrical members, pins interconnecting said cylindrical members to provide a hollow, flexible self-supporting cylindrical tube connected to said shafts.

References Cited in the file of this patent
UNITED STATES PATENTS

| | | |
|---|---|---|
| 516,018 | Lauer | Mar. 6, 1894 |
| 1,071,158 | Hurlbut | Aug. 26, 1913 |
| 1,599,257 | Voegeli | Sept. 7, 1926 |
| 2,193,607 | Votypka | Mar. 12, 1940 |
| 2,193,608 | Votypka | Mar. 12, 1940 |
| 2,637,891 | Sperry | May 12, 1953 |
| 2,973,991 | Werner | Mar. 7, 1961 |

FOREIGN PATENTS

| | | |
|---|---|---|
| 641,129 | France | Apr. 10, 1928 |
| 455,874 | Great Britain | Oct. 29, 1936 |